Jan. 14, 1969   W. P. LAWSON   3,421,666
FLUX RECOVERY DEVICE
Filed Sept. 19, 1966   Sheet 1 of 3
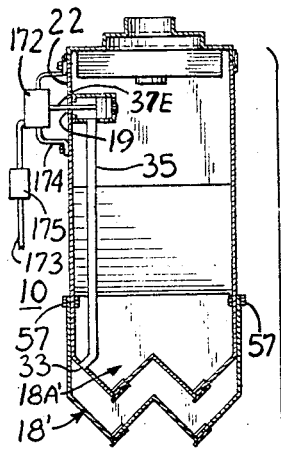
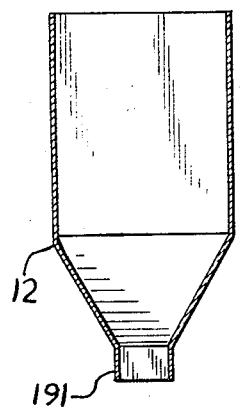
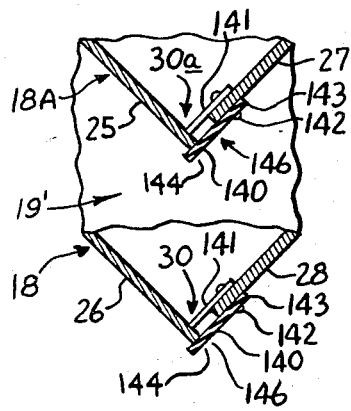
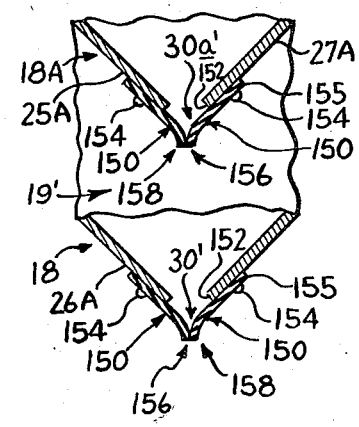
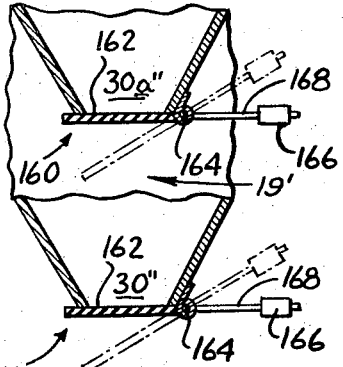
INVENTOR
WILLIAM P. LAWSON
by: Mann, Brown & McWilliams
ATTYS.

Jan. 14, 1969  W. P. LAWSON  3,421,666
FLUX RECOVERY DEVICE
Filed Sept. 19, 1966  Sheet 2 of 3

INVENTOR
WILLIAM P. LAWSON
by: Mann, Brown + McWilliams
ATTYS.

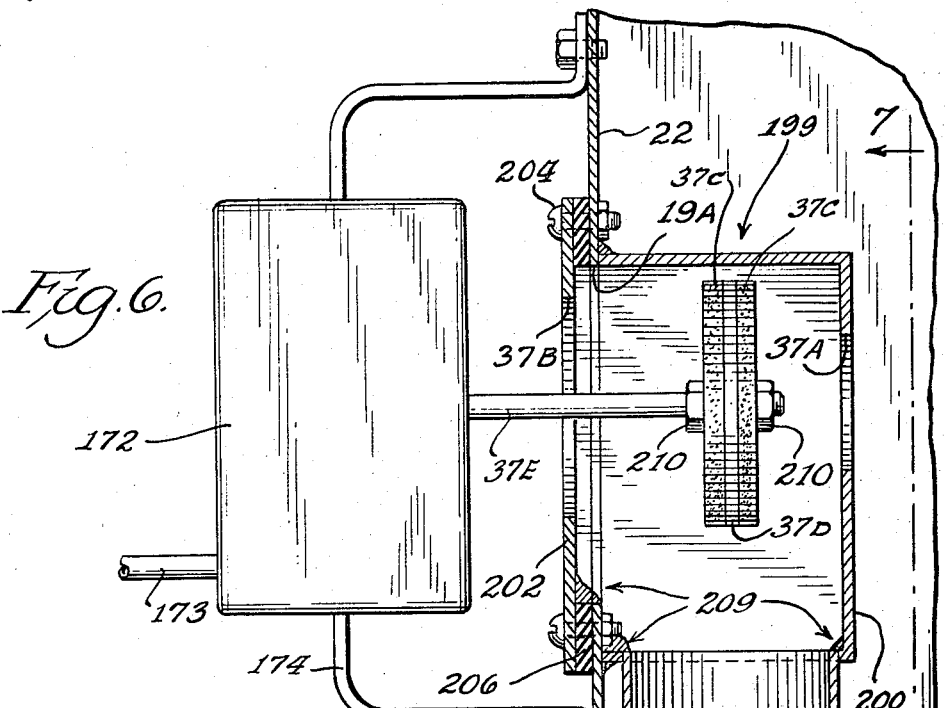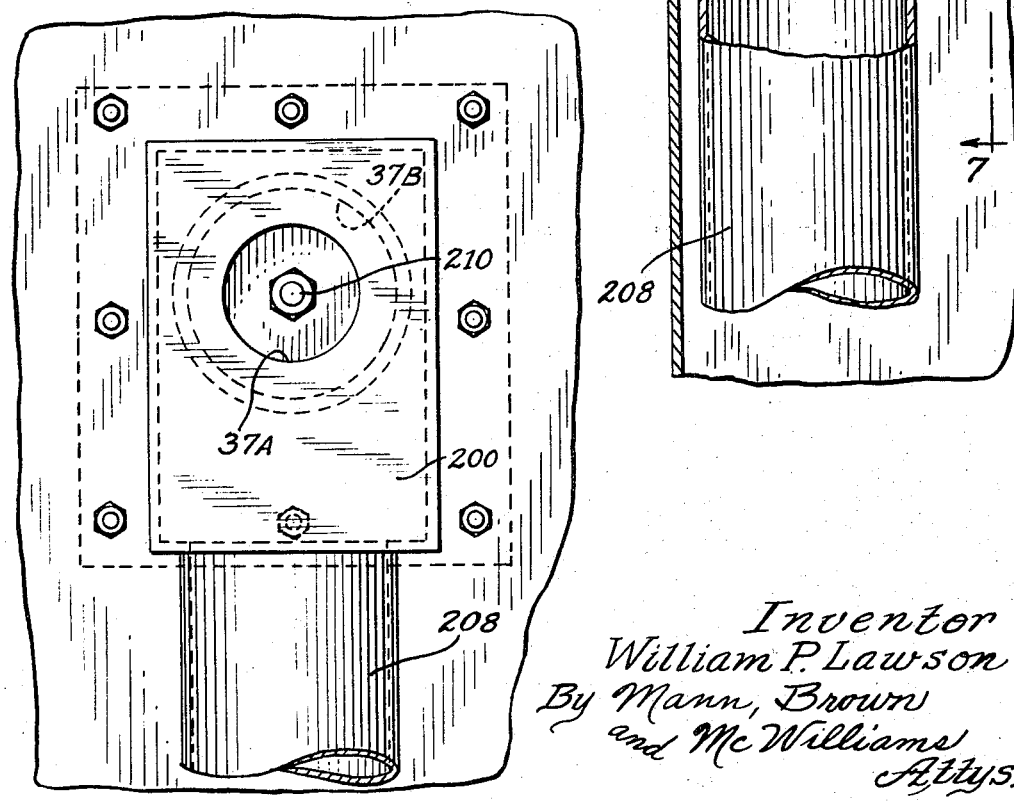

United States Patent Office 3,421,666
Patented Jan. 14, 1969

3,421,666
FLUX RECOVERY DEVICE
William P. Lawson, Hammond, Ind., assignor to Ogden Engineering Corporation, a corporation of Indiana
Filed Sept. 19, 1966, Ser. No. 580,486
U.S. Cl. 222—442                 8 Claims
Int. Cl. G01f 11/28

ABSTRACT OF THE DISCLOSURE

The disclosure is directed to a welding flux recovery device in the form of a hopper structure in the form of two chambers having outlets provided with pressure and gravity responsive valve means and wherein the lower chamber is alternately put into communication with the first chamber or with the atmosphere by a control valve arrangement.

---

This invention broadly relates to a vacuum operated welding flux collecting device wherein two chambers are put in and out of communication, the first chamber acting as a first receiver for the material collected and the second chamber acting as an intermediary for receiving the material collected prior to depositing the collected material in a storage or other appropriate means wherein the first and second chambers have outlets with pressure and gravity responsive valve means thereon and wherein the first and second collecting chambers are put into pressure equalizing communication by a conduit means having a valve which permits putting the intermediary chamber in communication with the atmosphere and closing the conduit communication to the first chamber while still maintaining a lower than atmospheric pressure in the first receiving chamber.

More specifically, the invention relates to a device for recovering welding flux used in connection with welding machines which returns the unused welding flux to the same supply container from which it initially passed on being fed into the welding zone.

This invention more specifically comprises, in part, an improvement over the device for recovering welding flux disclosed and claimed in pending application Ser. No. 399,032, filed Sept. 24, 1964 of Ralph P. Ogden and Oliver W. Law, now Patent No. 3,323,647, granted June 6, 1967 and the disclosure thereof is hereby incorporated herein by this reference.

The flux recovery arrangement disclosed in said copending application involves a recovery operation in which the actual flux pickup is intermittently interrupted as part of the functioning of the system in moving the flux back to the supply container. This is due to the fact that, in that arrangement, atmospheric pressure is relied on to exert a closing force on the flux flow valve means, and, as part of the operation involved, the source of vacuum is cut off from the main vacuum chamber to eliminate the pressure differential so that accumulated recovered flux empties by gravitational action from the recovery apparatus to the flux feeding hopper.

An object of the present invention is to provide a vacuum recovery device in which the flux pickup action need not be interrupted in order to restore the recovered material to the supply container.

It is another object of this invention to provide a flux recovery device that may be applied as an insert to the standard type of welding machine flux hopper to provide standard welding machines with a flux recovery system for effecting return of the flux to the hopper without interrupting the operation of the recovery device.

It is still another object of this invention to provide an automatically operated flux recovery device that is capable of selectively furnishing welding flux requirements without interruption of the recovery device.

Other objects, uses and advantages will be obvious or will become apparent from a consideration of the detailed description taken in conjunction with the drawings wherein like numerals of reference designate like elements and wherein:

FIGURE 1 is a diagrammatic perspective view illustrating a specific embodiment of this invention which may be applied to a standard welding flux hopper of a welding machine;

FIGURE 1a is an enlarged fragmentary view in cross-section of a portion of the apparatus depicted in FIGURE 1 and illustrating the novel control valve arrangement of this invention;

FIGURE 2 is an enlarged fragmental transverse cross-section of the lower portion of the apparatus depicted in FIGURE 1;

FIGURES 2a and 2b are enlarged fragmental transverse cross-sectional views of the lower portion of the apparatus depicted in FIGURE 1 illustrating alternate embodiments;

FIGURE 3 is a side view in cross section diagrammatically depicting a further alternate embodiment of the invention;

FIGURE 6 is a view similar to that of FIGURE 1a, but on an enlarged scale, and illustrating a modified control valve arrangement; and FIGURE 7 is a view along line 7—7 of FIGURE 6.

Figure 4:
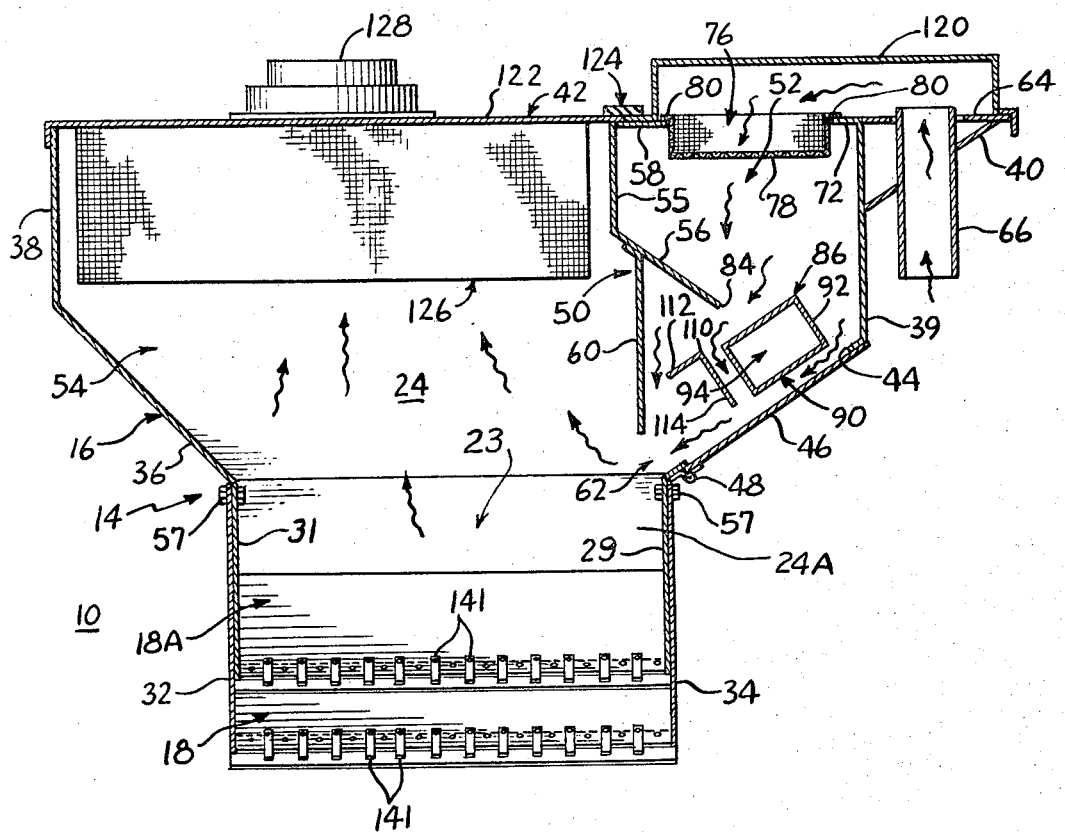
FIGURE 4 is a side view in cross section of the apparatus depicted in FIGURE 1.

However, it is to be understood that the drawing illustrations provided are supplied primarily to comply with the requirements of the patent code, and the invention may have other specific embodiments.

Basically, the invention comprises, in a flux recovery system, a first collecting chamber adapted to communicate to a vacuum source and to a material collecting means wherein the first collecting chambers has a gravity and pressure responsive valve means communicating to a second chamber also having a gravity and pressure reponsive valve means which communicates with a receiving means for the material to be collected, such as the welding flux supply hopper; a conduit or other passageway connects the first and second chambers in which is mounted a valve means that is adapted to alternately communicate said second chamber to atmosphere and shut off the conduit means communication to the first chamber and vice versa, to effect flux discharge under the action of gravity into the supply hopper while the flux recovery system continues to operate.

Reference numeral 10 throughout the various figures generally indicates specific embodiments of the invention adapted to be applied to a conventional welding flux supply hopper 12 (FIGURE 3) that is carried by automatic and semi-automatic welding machines for the purpose of serving as a source of supply of welding flux for the welding head or torch.

Referring specifically to FIGURES 1 and 4, the device 10 comprises a hopper structure 14 defining a flux receiving chamber and shaped to define an enlarged upper funneling portion 16 and a smaller lower funneling portion 18 proportioned to substantially complement the interior space of the conventional welding flux supply hopper (such as hopper 12 of FIGURE 3) so as to seat in the flux supply hopper 12 whereby the device 10 is supported on the welding machine by lower hopper funneling portion 18 being received in the welding flux supply hopper.

Within lower hopper funneling portion 18 is a smaller but similarly configured enclosed hopper funneling portion 18A having its outlet spaced vertically from the outlet of hopper funneling portion 18, with said funneling portions defining between them an air lock chamber 19. Hopper portion 18A, in the preferred form, is secured to the walls of upper funneling portion 16 by well known means such as soldering, welding or brazing, while hopper portion 18 is detachably secured to upper funneling portion 16. Hopper portion 18A is in open communication to funneling portion 16.

Hopper structure 14 generally comprises a pair of substantially planar front and rear sheets 22 and 24 which at their lower ends are secured, as by soldering or brazing, to side panels 21 and 23 of hopper 18A. Side panels 21 and 23 at their lower ends are secured to a pair of inwardly inclined bottom sheets 25 and 27 that are spaced apart at the lower end of hopper 18A to define outlet 30a (see FIGURE 2). Inclined bottom sheet 25 has an aperture 33 therethrough communicating with chamber 19' and spaced from outlet 30a. End panels 29 and 31 are joined to the front and rear sides of hopper structure 18A and to the adjacent portions of funneling portion 16, as by soldering, brazing, etc. to thereby define an open top providing direct communication to hopper funneling portion 16.

Hopper funneling portion 18 comprises a detachable structure including front and rear sheets 22A and 24A which at their lower ends are secured, as by soldering or brazing, to a pair of inwardly inclined bottom sheets 26 and 28 that are spaced apart at the lower end of structure 14 to define hopper outlet 30 (see FIGURE 2). Sheets 22A, 24A, 26 and 28 are joined together at the sides of funneling portion 18 by end sheets 32 and 34 thereby defining an open top that is closed by the application of funneling portion 18 to the rest of hopper structure 14. Preferably structure 18 is removably secured to funneling portion 16 in any suitable manner as by employing suitable bolts 57 (see FIGURE 4) with an appropriate vacuum sealing arrangement (not shown) being employed between the two hopper funneling portions (preferably the adjacent portions of funneling portions 16 and 18 are flanged for convenience in attachment and sealing).

The sheets 22 and 24 are joined together at the sides of the hopper structure 14 by end sheets 36, 38, 39 and 40, thereby defining an open top that is closed by enclosed hopper funneling portion 18A and cover structure 42, and an access port 44 at the side of the device 10 that is closed by a swinging panel 46 hinged in any suitable manner as at 48. The sheet 22 has an aperture 19 therethrough at an upper portion thereof for association with the now to be described control valve device 37.

An internally located conduit 35 (see FIGURE 1) connects apertures 19 and 33 (and thus chamber 19') through valve assembly 37 (see FIGURE 1a) in fluid tight relationship. Conduit 35 may be of rigid or flexible construction, and obviously conduit 35 and valve assembly 37 may be positioned externally of the hoppers rather than internally as shown. Valve assembly 37 is adapted to communicate the interior of hopper funneling portion 18 (chamber 19') to the atmosphere and, alternatively to put the interiors of hopper portions 16 and 18 into communication. In the form shown, valve 37 is positioned within the hopper structure 14 above funneling portion 16 and is secured to sheet 22.

As best seen in FIGURE 1a, valve assembly 37 comprises a housing 37H secured in place in any suitable manner having opposed openings 37A and 37B in alignment with aperture 19. Within housing 37H is reciprocally disposed plunger rod 37E supported by bracket 37S secured to the wall of sheet 22. Rod 37E has secured thereon suitable resilient or flexible members 37C, made of rubber, or other suitable fluid sealing material, separated by metal member 37D. The enlarged head 37F of rod 37E serves as a handle for manual opening and sealing of opposed openings 37A and 37B. The resilient members 37C respectively engage the walls of housing 37H that respectively define openings 37A and 37B at either end of the stroke of rod 37E to provide a suitable seat with the interior surface of outer housing 37H thereby providing fluid tight valving action as to the opening 37A or 37B which is to be closed. Members 37C and 37D are preferably proportioned so that they are spaced from the side wall of the housing, and conduit 35 connects to housing 37 through a funneling portion 35F that avoids any surfaces on which flux can build up to interfere with the operation of the sealing members 37C.

Other types of well known valves may be utilized in lieu of valve assembly 37, to achieve the broad objectives of the invention and its action may be automated rather than manual. However, the type of valving arrangement depicted (whether manually or automatically operated) provides, in essence, a self-cleaning valve which requires a minimum of maintenance and is preferred.

Referring to FIGURES 1 and 4, the configuration of hopper structure 14 is such that swinging panel 46 and the side panel 36 incline downwardly and inwardly toward the enclosed funneling portion 18A to, in part, define the upper funneling portion 16. Panel 46 may be secured in place by employing a suitable trunk lock where indicated at 132, as disclosed in said application Ser. No. 399,032.

Hopper structure 14 further includes the generally upright baffle structure 50 that extends crosswise of the hopper structure to define the hopper structure upper funneling portion 16 into an air intake chamber 52 and an air discharge chamber 54.

The baffle structure 50 comprises a plate 55 formed to define an inclined portion 56 that inclines towards port 44 and an upper angled portion 58 at the level of the top of hopper structure 14. Affixed to inclined portion 56 is a depending plate or baffle 60 that extends crosswise of the hopper structure to define at its lower end a port 62 that extends transversely of the hopper structure 14 to provide communication between the chambers 52 and 54, as well as communication between the chamber 52 and the lower hopper funneling portion 18A.

As indicated in FIGURE 4, at chamber 52 the sidewall 39 extends to the top of hopper structure 14 and inclined sidewall 40, together with a top bracing plate 64, serves as a mounting support for intake conduit 66 to which is to be attached in any suitable manner a flexible hose or conduit 68 provided with a suitable intake nozzle 70. Hose or conduit 68 should have a length appropriate to the vacuum pickup work it is supposed to do in and around the welding zone.

Sidewall 39 is formed with an angled end portion 72 to define with end portion 58 of panel 55 and the front and rear walls 22 and 24 an air intake port 76 in which is removably positioned a coarse mesh screen element 78 that is provided with a dished shape and laterally extending top flange 80 to sit in place in port 76 in the manner indicated in FIGURE 4. Screen element 78 rests in the position shown in FIGURE 4 during normal operation, and is removed from time to time to dump accumulated debris.

The lower edge 84 of panel 55 defines, with the swinging panel 46, an air confluence portion 86 in which is positioned a magnetic material (sometimes called tramp metal) removing magnet device 90.

The magnet device 90 comprises a tubular stripper member 92 formed from a suitable non-magnetic and magnetic flux transparent material such as brass, which is fixed between the hopper structure front and rear walls 22 and 24 in the position indicated in FIGURE 4. Mounted in the tubular stripper member 92 is a permanent magnet 94 in the form of an assembly of alternating sheets 96 of low carbon iron and ceramic magnet pieces 98 set in high coercive repulsion and bonded together in any suitable manner. Magnet pieces 98 are of the type made by Arnold Engineering Company and sold as its Arnox 5 Ceramic Magnet.

Front sheet or panel 22 is perforated or formed with a port as at 100 (see FIGURES 1 and 5) to provide an opening for inserting and removing the magnet 94 with respect to stripper member 92.

As indicated in FIGURE 1, the swinging panel 46 is provided with an appendage 102 that serves to close over the port 100 in the closed position of the panel 46 and keep the magnet 94 from accidentally falling out of the tubular stripper member 92.

Magnet 94 is provided with a suitable handle 104 to aid in inserting and withdrawing same to and from the tubular stripper member 92. As disclosed in said application, on withdrawal of magnet 94, magnetic material adhering to member 92 drops away therefrom to discharge through port 44 (assuming panel 46 has been opened).

Tubular stripper member 92 and magnet 94 are shown to be quadrilateral in cross-sectional configuration, but they could be round insofar as the broad objectives of this invention are concerned.

Positioned downstream of magnet device 90 is an angle shaped baffle member 110 that defines baffle walls 112 and 114 for insuring air flow in the directions indicated by the arrows and deflecting tramp magnetic material from port 62 when the magnet device 90 is cleaned by the magnet withdrawal above referred to.

Figure 5:
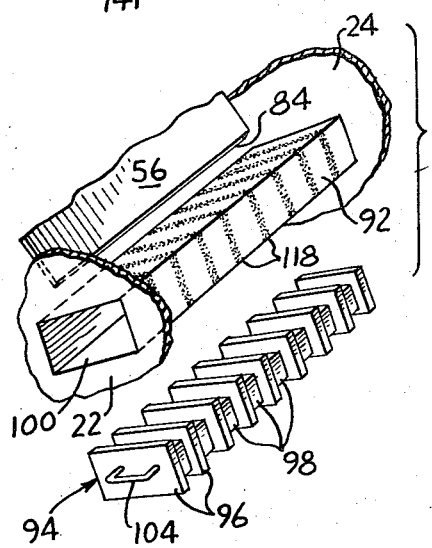
FIGURE 5 is a fragmental perspective view showing a magnetic material removing magnet device used in accordance with this invention, with the magnet device displaced from its housing.

The baffle arrangement of chamber 52 is arranged to insure good air flow around the exterior surfaces of tubular member 92 so that magnetizable particles picked up on operation of the vacuum system will have good contact with the tubular member 92, the tramp metal accumulating on the tubular stripper member 92 in the spaced row relationship indicated at 118 in FIGURE 5.

Cover structure 42 includes intake chamber cover portion 120 and air discharge chamber cover portion 122, and these portions are hinged together as at 124 in any suitable manner, as by a strip of Mylar or a suitable hinge. Cover portion 122 has secured thereto a suitable air filter structure 126 of any appropriate type and an adapter 128 for connecting thereto, for mounting thereon, a suitable blower device, not shown. The blower may be located at a point removed from hopper structure 14, in which case a suitable conduit would be employed to connect the adapter 128 and the blower.

The cover structure 42 and its cover portions 120 and 122 are formed to appropriately fit over the top of hopper structure 14 and cover structure 42 may be locked in place by being secured to the hopper front and rear walls 22 and 24 by means of suitable trunk locks 132 or the like. A similar trunk lock arrangement 132 may be employed to latch panel 46 in place.

Referring to FIGURE 2, the outlets 30 and 30a of hopper funneling portions 18 and 18A respectively, in accordance with one embodiment, are closed by resiliently flexible strips 140 secured in place to the respective sheets 28 and 27 by appropriate rivets or the like 142 applied only along one edge 143 of each of the strips 140. Each of the strips 140, which may be of 50 durometer natural rubber, is positioned to have it respective contact with the lower edge 144 of sheets 25 and 26; strips 140, in practice, are spaced somewhat from the respective edges 144 and move to a closed positions shown in FIGURE 2 when a pressure differential exists.

Each of the strips 140 forms a vacuum or pressure differential and gravity sensitive valve device 146. Valve device 146 of hopper portion 18 closes off outlet 30 of hopper portion 18 (when chamber 54 is connected to a source of vacuum) during the period valve plunger rod 37E of valve assembly 37 is in its atmosphere closing position, i.e., farthest to the left as viewed in FIGURE 1a, due to the outside pressure being higher than that in hopper 18. Valve device 146 of hopper structure 18A would assume its normally slack partially open position as soon as the pressures in hoppers 18 and 18A were equally low, which equalization occurs very rapidly through port 33, conduit 35, and port 37A of valve body 37H; however, the weight of accumulated flux bearing on strip 140 of hopper 18A forces its strip 140 away from outlet 30a a short time before pressure equalization is complete since the sealing force becomes progressively weaker as the pressures approach equality. Also, the weight of the flux forces strip 140 to assume a farther open position than it would if no flux was present.

Recovered flux runs through open outlet 30a into the closed hopper portion 18 until such time as plunger rod 37E is moved to its farthest right position as viewed in FIGURE 1a (or until the pile angle of accumulated flux prevents more flux entering hopper 18). When plunger rod 37E is then moved to its farthest right position (either manually or, preferably, automatically), closing off port 37A from chamber 54 and opening port 37B of housing 37H to the atmosphere, air enters valve housing 37H through port 37B, then enters conduit 35, and then enters hopper 18 through port 33 rapidly relieving the vacuum in hopper 18 and bringing hopper 18 up to atmospheric pressure. Valve device 146 of hopper 18A closes due to the higher external pressure acting on it and valve device 146 of hopper 18 opens due to having the same pressure on both sides of it. The weight of the flux hastens and increases this opening somewhat. The flux accumulated in hopper 18 then runs out of outlet 30 of hopper 18 and into the welding flux supply hopper, such as 12, indicated in FIGURE 3. While valve device 146 of hopper 18A is closed, recovered flux accumulates in hopper 18A and continues to accumulate there until valve plunger rod 37E is again moved to its atmospheric closing position.

Preferably, but not necessarily, a plurality of spaced finger like elements 141 (or alternately screening) are secured to the top surface of sheets 27 and 28, by means of rivets, soldering or welding, to prevent each of the strips 140 from being drawn up into the interiors of hoppers 18A and 18 when a sizeable negative pressure is present in the interiors thereof and atmospheric pressure is outside thereof.

In the alternate arrangement shown in FIGURE 2a, the outlet port 30a' is at the lower apex of the lower funneling portion of hopper 18A. Similarly the outlet 30' is at the lower apex of the hopper 18. A pair of flexible strips 150 are secured in place along the hopper structures' lower edges 152 as by appropriate rivets 154 extending along each of the edges 155 only of the respective strips 150. The strips 150 are proportioned so that when secured in place they engage each other below outlets 30a' and 30' as indicated at 156 to define a pair of sealing lips that extend lengthwise of the outlets 30a' and 30', which in turn extend lengthwise of the hopper funneling portions.

Each of the sealing lip arrangements of FIGURE 2a defines a vacuum and gravity sensitive outlet valve 158 that operates in the same manner as the valve 146 of FIGURE 2, strips separating under the weight of the accumulated flux, on shutting off of the source of vacuum, or operation of the valve assembly 37, to allow the flux to fall by gravity into hopper portion 18 and thereafter a flux supply hopper such as 12.

Alternately, the lower funneling portion outlets of hopper portions 18 and 18A may be provided with gravity and vacuum sensitive valve arrangement 160 of FIGURE 2b, which comprises a plate 162 for each hopper portion pivoted as at 164 to close outlets 30a" and 30", with each of the plates 162 being provided with a counterweight 166 secured in any suitable manner to an arm 168 that is affixed to the plate 162. Gravity and vacuum sensitive valve arrangements 160 open in the manner indicated in the dashed line positions when an amount of welding flux in excess of the bias provided by the counterweight 166 has accumulated on top of plate 162 and the valving assembly 37 is manually or automatically operated.

The counterweight bias of the embodiment of FIGURE 2b should be no greater than needed to cause the plate 162 to close the hopper opening without undue delay. Alternately, arm 168 can be bent downward so the bias can be so adjusted that plate 166 does not close the hopper opening when the pressures are equal but is still near enough for the pressure differential (when generated) to cause plate 166 to move to seal the opening. The opening can also be such that the plate 166 is tilted somewhat down (45 degrees, e.g.) in the sealing position.

The embodiment depicted in FIGURE 3 shows a differently contoured hopper wherein the hoppers 18' and 18A' are W-shaped in cross section thereby forming two flux receiving areas per hopper. Obviously three, four, or more such areas may be provided. The hopper 18A' is shown as integral with the side panels of the device 10 with hopper 18' being a removably fastened unit by means of bolts 57 or the like. Any of the valve arrangements heretofore described may be used although the valving of FIGURE 2 is depicted. In this embodiment, a solenoid 172 is shown secured to wall 22 via brackets 174 and energized via wire 173 connected to an energy source not shown. The plunger rod 37E with end portion 37F removed is secured to the plunger of the solenoid, or alternately, the rod 37E may itself provide the plunger of the solenoid. A timing means 175 inserted in the circuitry will provide for automatic, predetermined activation of the solenoid 172 and thus valve arrangement 37. Other means may also be used to effectuate automatic operation of the valving arrangement as for instance employing a suitably arranged timer motor in place of the solenoid, or by photoelectric or weight sensitive means which would operate the solenoid or oher means predicated upon the height of the flux pile in the hopper portion 18' and 18A'.

Because of the W-shaped cross section of each of the hoppers 18' and 18A' and the two outlets in each, it is possible to dump a greater amount of flux per unit of time than when only one opening is provided as depicted in FIGURE 2. The sum of the time needed for dumping a given amount of flux from hopper 18' and refilling 18' (with the same amount) must not exceed the time required to pick up the same amount of flux via conduit 68; otherwise hopper 18A' will become filled and tend to decrease the efficiency of the collecting device. The greater the capacity of hopper 18', the less often solenoid 172 will have to operate.

Desirably, the openings 37A, 37B and that for conduit 35 should be no larger than necessary to enable the rapid equalization of pressures between the chambers formed by the hoppers 18A and 18 and between hopper 18 and the atmosphere. It has been found that one and one-half inch diameter openings are adequate. By keeping these openings and thus the valve member 37C to a minimum size and by keeping the distance between openings at a suitable minimum a shorter stroke and less powerful and hence more economical solenoid may be employed since, for instance the forces acting on the valve surfaces dictate the size of the solenoid needed for effective operation. Similar remarks apply to the other embodiments of the invention.

The valving assembly 37 depicted is of desirable construction since the valving elements 37C act in compression only, and since the valve seats are vertical which avoids accumulation of flux on the seats the valve is self-cleaning as any flux trapped within the valve housing 37H will drop down through conduit 35 into the hopper 18 or remain in small piles below the operating space of sealing members 37C. Therefore, conduit 35 should not, for blockage-free operation, have lengths of horizontal runs in which flux could accumulate and is thus preferably substantially vertically disposed. Preferably, the valving assembly is placed at the upper portion of hopper structure 14 where the atmosphere is less saturated with flux and above where flux normally accumulates, thereby insuring proper operation of the valving assembly 37.

In the form of FIGURES 6 and 7, another alternate valve assembly 199 to valve assembly 37 is illustrated in association with solenoid 172 of FIGURE 3 in which housing 200 has an open front and is secured to sheet 22 (as by soldering or brazing) about an enlarged aperture 19A formed therein. Housing 200 has opening 37A formed therein while the opening 37B is formed in an aperture plate 202 secured to sheet 22 by suitable screws 204 (with an appropriate seal 206 being employed between plate 202 and sheet 22). Enlarged conduit 208 leads to an aperture in sheet 25 (not shown) which is comparable to aperture 33 but enlarged to the internal diameter of conduit 208. Conduit 208 is affixed directly to the housing 200 and its bore is proportioned so that all flux trapped in housing 200 will drop back through conduit 208 except for small pile ups (as indicated at 209) that may occur below the path of operation of control rod 37E that carries members 37C and 37D adjustably secured in place by nuts 210. This form of valve assembly permits ready removal of control rod 37E by disconnecting plate 202 for inspection and changing of seal members 37C when so desired (assuming solenoid 172 is also detached by removing its securing screws 214, in the form illustrated).

The inclined side walls 25 and 27 and 26 and 28 of hoppers 18A and 18, respectively, preferably form an angle of about 40 degrees with horizontal since it has been determined that this angle provides for the most efficient flux flow and flux capacity combination. While decreasing this angle will, for a given height, provide additional volume in which the flux can be accumulated, it has been experimentally determined that flux will not flow well below an angle of about 35 degrees from horizontal.

It will be understood that suitable seals may be employed between the cover portions 120 and 122 and the hopper structure as may seem necessary or desirable.

In operation, the device 10 is inserted in the top of a welding flux hopper 12 of a welding machine to place the device 10 in its operative position. As already indicated, the lower hopper structure funneling portion 18 complements the interior of the hopper 12, and, consequently, the hopper structure 14, at its lower position, nests within the top portion of hopper 12. Hopper 12 ordinarily is provided with a suitable flux flow control valve at 191 and conduits (not shown) leading to the welding heads supplied by the hopper 12.

After the air discharge chamber 54 of hopper structure 14 is connected to a source of vacuum, air is drawn into the air intake chamber 52 due to the vacuum conditions achieved inside the hopper structure 14. The vacuum and gravitational sensitive valves 146, and 158, or 160 of hopper 18A', which are pressure differential responsive in nature, close when these vacuum conditions are created.

When the nozzle 70 of flexible conduit or hose 68 is applied to flux that is to be recovered, the flux is drawn through the flexible hose or conduit 68, through conduit 66 and into the air intake chamber 52, through screen element 78 and thence against the sides of magnet device tubular member 92. The air flow about the tubular member 92 is such that good contact is provided with substantially all of the flux passing into the air converging area 86 with the result that particles of magnetic material will adhere to the tubular member 92, with the flux passing with the air flow through port 62 and into the hopper structure lower funneling portion 18A to accumulate on top of the hopper structure outlet valve devices. The air passes through air filter structure 126 and out through cover portion 122 to and through the blower in the usual manner for such devices.

With regard to the vacuum sensitive valve arrangements 146 and 158, when the valving assembly 37 or its herein described alternates is operated in the manner previously described, the flux accumulated in the hopper structure lower funneling portion 18A, by its weight, opens the vacuum sensitive valve involved (and somewhat sooner and somewhat farther than pressure equalization alone would) so that the flux will fall into hopper 18 and eventually into hopper 12 without interrupting the collecting of the flux via nozzle 70.

In connection with the valve device of FIGURE 2b, during operation of the flux recovery system, when the flux accumulating on top of plate 162 has accumulated in excess of the weight dictated by counterweight 166, and the valving assembly 37 or its disclosed equivalent is operated, the valve 160 opens to drop the excess accumulated flux to either hopper 18 or into the hopper 12.

As a considerable amount of magnetic material is picked up during the flux recovery process, it is occasionally necessary to clear the trapped particles. This is readily done merely by withdrawing the magnet 94, after the panel 46 has been opened, so that the particles will then drop free of the tubular member 92 and out of the hopper structure through the port or opening 44. The inclined wall 114 of baffle plate 110 insures that metal particles on the adjacent upwardly facing side of the member 92 will not fall through port 62, and it will also be noted that panel 46 provides an inclined chute for guiding released particles away from port 44.

It is readily apparent that a flux recovery apparatus, which is efficient and automatic in operation, has been disclosed for recovering the large amount of unmelted flux that is currently necessitated in present welding practices. For instance, a 5/16" fillet weld is usually put down at a rate of about 18 to 26 inches per minute. This size weld would entail about 0.2 pound of electrode per foot. Since it has been determined that about one pound of flux is melted per pound of weld metal deposited and since about four pounds of flux are deposited for every pound melted, it is desirable to have an efficient recovery system for the unused flux.

The apparatus may be modified, as for instance, by placing an extra wand or conduit and nozzle, similar to 68 and 70, in a flux storage container to insure the supply of flux in a flux supply hopper such as 12. Under these circumstances virgin (as well as recovered) flux would be continuously (or intermittently by use of a suitable valve) fed through the recovery apparatus to the flux supply hopper.

Additionally, while hopper structure 14 is disclosed as being shaped to be mounted inside flux hopper 12, hopper structure 14 alternately may be shaped to rest on top of or over hopper 12, as will be immediately apparent to those skilled in the art. Also, hopper structure 14 may be mounted at any desired elevation with respect to the heads and function properly; this is to be distinguished from present flux recovery arrangements which must have a high mounting to give a head of pressure on the flux so that it will flow out of the vacuum chamber.

I claim:
1. In a welding flux recovery device for welding machines adapted to be applied to welding machine flux hoppers and including a hopper structure including a lower funneling portion defining an outlet at the lower end thereof and proportioned to be received within the upper portion of a welding machine hopper, said hopper structure defining a flux receiving chamber, said chamber being in open communication with said outlet, means connecting said flux receiving chamber to a source of vacuum, conduit means for conveying flux laden air under the motivation of the source of vacuum to said chamber, and gravity and pressure differential responsive valve means at said outlet for controlling the discharge from said outlet of the flux that is received in said funneling portion from said chamber, the improvement wherein said hopper structure further includes:

a second funneling portion positioned below said first funneling portion,
said second funneling portion being proportioned to be received within the upper portion of the welding machine hopper and defining an outlet at the lower end thereof,
said second funneling portion defining with said first funneling portion of an air lock chamber between them into which said valve means opens from said first funneling portion,
means for securing said second funneling portion in fluid tight relation to said hopper structure,
gravity and pressure differential responsive valve means at said second funneling portion outlet for controlling the discharge from the latter of flux that is received in said second hopper funneling portion,
and air pressure control means for alternately connecting said air lock chamber to the atmosphere and to the source of vacuum,
said control means comprising:
a housing carried by said hopper structure and defining an air flow chamber,
said housing at one portion thereof being formed with a first port in communication with the atmosphere,
said housing at another portion thereof being formed with a second port in communication with said hopper structure flux receiving chamber,
said housing at a third portion thereof being formed with a third port,
conduit means flow communicating between said third port and said air lock chamber,
a valve member shiftably mounted in said housing and placing said first and third ports in flow communication to the exclusion of said second port in one position thereof, and placing said second and third ports into flow communication to the exclusion of said first port in a second position thereof,
and means for moving said valve member between said positions thereof,
said gravity and pressure differential responsive valve means of the respective funneling portions each comprising:
pressure differential sensitive lip means positioned over the respective funneling portion outlet openings with a portion thereof free to deflect away from the respective outlet openings under the weight of flux accumulating in the respective funneling portions,
whereby, when said flux receiving chamber is connected to the source of vacuum and said valve member is in its said one position, the first mentioned funneling portion lip means is pressed against the outlet thereof by the pressure differential resulting from atmospheric pressure in said air lock chamber and the vacuum in said flux receiving chamber to close said first mentioned funneling portion valve means, and said second funneling portion valve means opens under the weight of any flux in said second funneling portion to permit discharge of same therefrom, and when said valve member is in its said second position, the second funneling portion lip means is pressed against the outlet thereof by the pressure differential resulting from the outside atmospheric pressure, with said air lock chamber being subject to the vacuum of said flux receiving chamber to close said second funneling portion valve means, and said first funneling portion valve means opens under the weight of any flux in said first mentioned funneling portion to permit discharge of same therefrom into said air lock chamber.

2. The improvement set forth in claim 1 wherein said second funneling portion outlet comprises the only outlet of said air lock chamber.

3. The improvement set forth in claim 1 wherein each of said lower funneling portions are W-shaped in cross section and define two outlets per funneling portion that each include said gravity and pressure differential responsive valve means.

4. The improvement set forth in claim 1 wherein said means for moving said valve member is automatically operated at predetermined time intervals to accumulate recovered flux in said air lock chamber and discharge same therefrom.

5. The improvement set forth in claim 1 wherein said lower funneling portions are defined by walls having an angle of about 40 degrees with respect to the horizontal.

6. The improvement set forth in claim 1 wherein:
said first and second ports of said control means housing are disposed in vertical planes,
said valve member being mounted in said control means housing for reciprocating movement between fluid tight sealing relation positions with respect to said first and second ports,
said third port of said control means housing being disposed in a horizontal plane to one side of the path of movement of said valve member and being located intermediate said first and second ports,
said control means housing being proportioned to provide communication between said third port and the one of said first and second ports that is not engaged by said valve member in said fluid tight relationship.

7. The improvement set forth in claim 6 wherein:
said third port is positioned in the lower portion of said control means housing,
said conduit means being substantially vertically disposed to avoid entrapment of flux moving from said housing to said air lock chamber.

8. The improvement set forth in claim 7 wherein:
said third port is proportioned to be substantially coextensive with said lower portion of said housing.

References Cited

UNITED STATES PATENTS

| | | | |
|---|---|---|---|
| 1,766,221 | 6/1930 | Lynch | 55—479 |
| 1,890,845 | 12/1932 | Elston | 222—561 |
| 2,265,707 | 12/1941 | Wall | 55—467 |
| 2,760,595 | 8/1956 | Pynor | 55—432 |
| 2,772,817 | 12/1956 | Jauch | 55—432 |
| 2,890,081 | 6/1959 | Terrett | 55—428 |
| 2,895,652 | 7/1959 | Rockriver | 222—453 |
| 3,190,509 | 6/1965 | Kirchhoeffer | 222—450 |
| 3,235,141 | 2/1966 | Couffer | 222—453 |
| 3,323,647 | 6/1967 | Ogden et al. | 209—223 |
| 3,325,625 | 6/1967 | Ogden | 219—125 |

FOREIGN PATENTS 509,838 2/1955 Canada.

HARRY B. THORNTON, *Primary Examiner.*

B. NOZICK, *Assistant Examiner.*

U.S. Cl. X.R.

55—100, 432, 472, 482; 209—223; 222—450

UNITED STATES PATENT OFFICE
CERTIFICATE OF CORRECTION

Patent No. 3,421,666                        January 14, 1969

William P. Lawson

It is certified that error appears in the above identified patent and that said Letters Patent are hereby corrected as shown below:

Column 10, line 8, after "portion" cancel "of".

Signed and sealed this 17th day of March 1970.

(SEAL)
Attest:

Edward M. Fletcher, Jr.                    WILLIAM E. SCHUYLER, JR.
Attesting Officer                            Commissioner of Patents